United States Patent
Miura

(10) Patent No.: US 11,215,130 B2
(45) Date of Patent: Jan. 4, 2022

(54) FUEL VAPOR PROCESSING SYSTEM

(71) Applicant: DENSO CORPORATION, Kariya (JP)

(72) Inventor: Yuichiro Miura, Kariya (JP)

(73) Assignee: DENSO CORPORATION, Kariya (JP)

( * ) Notice: Subject to any disclaimer, the term of this patent is extended or adjusted under 35 U.S.C. 154(b) by 277 days.

(21) Appl. No.: 15/583,326

(22) Filed: May 1, 2017

(65) Prior Publication Data
US 2018/0045127 A1  Feb. 15, 2018

(30) Foreign Application Priority Data

Aug. 10, 2016 (JP) .............................. JP2016-157502

(51) Int. Cl.
| | | |
|---|---|---|
| F02D 41/00 | (2006.01) | |
| B60K 15/035 | (2006.01) | |
| F02M 25/08 | (2006.01) | |
| B60K 15/03 | (2006.01) | |

(52) U.S. Cl.
CPC .......... *F02D 41/003* (2013.01); *B60K 15/035* (2013.01); *B60K 15/03519* (2013.01); *F02M 25/0809* (2013.01); *F02M 25/089* (2013.01); *F02M 25/0854* (2013.01); *B60K 2015/03217* (2013.01); *B60K 2015/03296* (2013.01); *B60K 2015/03576* (2013.01); *B60K 2015/03585* (2013.01)

(58) Field of Classification Search
CPC .............. F02D 41/003; F02M 25/0809; F02M 25/0854; F02M 25/089; B60K 2015/03217; B60K 2015/03576

USPC ......................................................... 123/519
See application file for complete search history.

(56) References Cited

U.S. PATENT DOCUMENTS

| | | | |
|---|---|---|---|
| 5,505,182 A | 4/1996 | Denz et al. | |
| 5,765,540 A | 6/1998 | Ishii et al. | |
| 5,911,209 A * | 6/1999 | Kouda | F02M 25/0809 123/198 D |
| 2009/0266147 A1* | 10/2009 | Maegawa | F02M 25/0818 73/40.7 |
| 2014/0102421 A1* | 4/2014 | Kato | F02M 25/0818 123/520 |

FOREIGN PATENT DOCUMENTS

| | | |
|---|---|---|
| JP | H06-193518 A | 7/1994 |
| JP | 2005-023796 A | 1/2005 |
| JP | 2006-188090 A | 7/2006 |
| JP | 2006-348901 A | 12/2006 |
| JP | 2007-009891 A | 1/2007 |

* cited by examiner

*Primary Examiner* — Lindsay M Low
*Assistant Examiner* — Omar Morales

(57) ABSTRACT

The present disclosure provides a fuel vapor processing system. The system includes a tank passage, a canister, a purge passage, an air passage, a purge valve, a controller, a fuel vapor processing portion, a pressure sensor, a fuel refill detecting portion, and an abnormality detecting portion. The fuel refill detecting portion detects that fuel refill to the fuel tank is started or fuel refill to the fuel tank is being performed by executing a fuel refill detecting process. An abnormality detecting portion detects, by executing an abnormality detecting process, a clogged situation where the tank passage is clogged based on a signal from the pressure sensor received after the fuel refill detecting portion detected that the fuel refill to the fuel tank was started.

18 Claims, 11 Drawing Sheets

FUEL VAPOR PROCESSING SYSTEM

CROSS REFERENCE TO RELATED APPLICATION

This application is based on reference Japanese Patent Application No. 2016-157502 filed on Aug. 10, 2016, the disclosure of which is incorporated herein by reference.

TECHNICAL FIELD

The present disclosure relates to a fuel vapor processing system that processes fuel vapors in a fuel tank, more specifically, to a fuel vapor processing system that detects a clogged situation.

BACKGROUND

Conventionally, a fuel vapor processing system that is capable of detecting a clogged situation where a tank passage is clogged. Such a conventional system includes a pressure sensor configured to detect a pressure in the tank passage connecting a fuel tank to a canister. For example, a patent literature JP H06-193518 A discloses a fuel vapor processing system configured to apply a negative pressure of an intake air to a fuel tank, a tank passage, and a purge passage during an idling operation of a vehicle. Then, the system detects the clogged situation based on the signal from the pressure sensor.

As described above, the system disclosed in the patent literature detects the clogged situation based on the signal from the pressure sensor by applying a negative pressure of an intake air during operation of an internal combustion engine. As a result, the signal from the pressure sensor may be unstable, and thus accuracy of detecting the clogged situation would be deteriorated.

In view of the above, it is an objective of the present disclosure to provide a fuel vapor processing system with high accuracy of detecting a clogged situation in the system.

SUMMARY

An aspect of the present disclosure provides a fuel vapor processing system including a tank passage, a canister, a purge passage, an air passage, a purge valve, a controller, a fuel vapor processing portion, a pressure sensor fuel refill detecting portion and an abnormality detecting portion. The tank passage has one end connected to a fuel tank storing fuel. The canister absorbs fuel vapors generated from the fuel in the fuel tank through evaporation. The canister is connected to an other end of the tank passage. The purge passage has one end connected to the canister and an other end connected to an intake passage of an internal combustion engine of a vehicle. The air passage has one end connected to the canister and an other end open toward an atmosphere. The purge valve selectively opens and closes the purge passage.

The controller controls operation of the purge valve. The fuel vapor processing portion discharges the fuel vapors into the intake passage by controlling the purge valve through the controller. The pressure sensor detects a pressure in the fuel tank, the tank passage, the canister, or the purge passage. The pressure sensor outputs a signal according to the detected pressure. The fuel refill detecting portion detects that fuel refill to the fuel tank is started or fuel refill to the fuel tank is being performed by executing a fuel refill detecting process.

The abnormality detecting portion detects, by executing an abnormality detecting process, a clogged situation where the tank passage is clogged based on the signal from the pressure sensor received after the fuel refill detecting portion detected that the fuel refill to the fuel tank was started.

An amount of fuel in the fuel tank increases during fuel refill to the fuel tank, whereas the volume of the upper space decreases. Hence, an air in the upper space flows out through the ventilation passage formed of tank passage, the canister, and the air passage toward the atmosphere. When the tank passage is clogged with fuel or foreign substances, the pressure in a region between the clogged portion and one side close to the fuel tank increases during the fuel refill, whereas the pressure in a region between the clogged portion and the other side away from the fuel tank does not increase during the fuel refill.

In the above aspect of the present disclosure, the pressure sensor is disposed in the fuel tank, the tank passage, or the canister, and the clogged situation can be detected after the fuel refill detecting portion detected that fuel refill to the fuel tank was started, in other words, based on the signal from the pressure sensor during the fuel refill.

In this way, the clogged situation can be detected in view of pressure change in the upper place due to the fuel refill to the fuel tank. Accordingly, the signal output from the pressure sensor can be stable as compared to a conventional way where a clogged situation is detected using a negative pressure of an intake air, whereby accuracy of detecting the clogged situation can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

It is needless to say that following embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Figure 1:
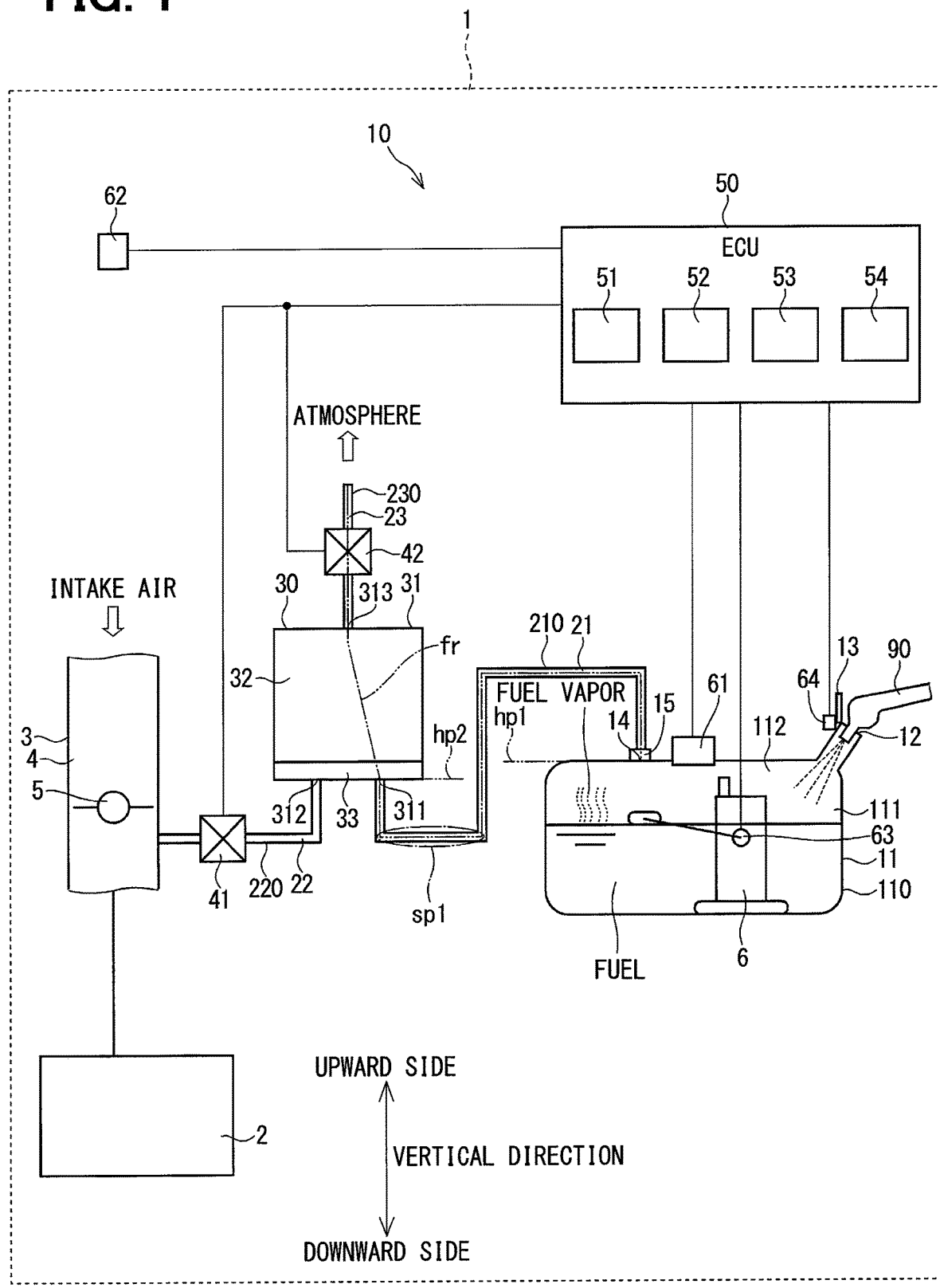
FIG. 1 is a schematic view of a fuel vapor processing system according to a first embodiment.

FIG. 1 shows a fuel vapor processing system 10 according to a first embodiment.

The fuel vapor processing system 10 of the present embodiment is applied to a vehicle 1 having an engine 2 as an internal combustion engine.

The vehicle 1 includes the engine 2, an intake pipe 3, a fuel tank 11, the fuel vapor processing system 10.

The vehicle 1 is traveled by a driving force generated by the engine 2. The engine 2 operates by, e.g., a gasoline as fuel. That is, the engine 2 is a gasoline engine.

The intake pipe 3 is connected to the engine 2. The intake pipe 3 defines therein an intake passage 4. The intake passage 4 has one end connected to a combustion chamber of the engine 2 and the other end open toward the atmosphere. The intake passage 4 guides an air from the atmosphere to the combustion chamber of the engine 2. The air (hereinafter, referred to as an "intake air") taken into the combustion chamber through the intake passage 4 is mixed with a fuel sprayed from an illustrated fuel injector to form a mixed gas. By combusting the mixed gas in the combustion chamber, the engine 2 operates (i.e., rotated).

A throttle valve 5 is disposed in the intake passage 4. The throttle valve 5 controls an amount of the intake air to be taken into the engine 2 by selectively opening and closing the intake passage 4.

The fuel tank 11 stores a fuel therein to be supplied to the engine 2. A fuel pump 6 is disposed in the fuel tank 11. The fuel pump 6 takes in the fuel in the fuel tank 11, compresses the fuel, and then discharges the compressed fuel. The fuel discharged from the fuel pump 6 is supplied to the engine 2 through unillustrated pipes, unillustrated fuel rails, and the fuel injector.

The fuel tank 11 includes a tank body 110, a tank cap 13, and a full level valve 15.

The tank body 110 is formed of a metal, for example, to have a box shape. The tank body 110 defines therein a tank space 111 to store the fuel therein.

A fuel tank opening 12 is defined in the tank body 110. The tank space 111 is in fluid communication with an outside of the tank body 110 through the fuel tank opening 12. The fuel tank opening 12 is positioned above the tank body 110 in the vertical direction when the fuel tank 11 is installed in the vehicle 1. The fuel opening 12 is configured to allow a fuel nozzle 90 to be inserted into the fuel tank opening 12. As a result, fuel can be refilled into the tank space 111 of the fuel tank 11 from the fuel nozzle 90 inserted into the fuel tank opening 12. In other words, fuel refill can be performed.

The tank cap 13 is attached to a position adjacent to the fuel tank opening 12 to open and close the fuel tank opening 12. The tank cap 13 is manually rotated to open or close.

The tank body 110 defines an opening 14. The tank space 111 is in fluid communication with an outside of the tank body 110 through the opening 14. The opening 14 is positioned above the tank body 110 in the vertical direction when the fuel tank 11 is installed in the vehicle 1.

The fuel level valve 15 is disposed in the opening 14. The fuel level valve 15 automatically closes the opening 14 when the fuel space 111 is filled with fuel, i.e., the fuel tank 11 is full. The fuel level valve 15 automatically opens the opening 14 when the fuel in the fuel tank 11 is discharged.

When the fuel is stored in the fuel tank 11, fuel vapors generate in the tank space 111 from the fuel in the fuel tank 11 through evaporation.

The fuel vapor processing system 10 is a system to process the fuel vapors generated in the fuel tank 11.

The fuel vapor processing system 10 includes a tank passage 21, a canister 30, a purge passage 22, an air passage 23, a purge valve 41, an air valve 42, an electronic control unit (hereinafter, referred to as a "ECU") 50, a pressure sensor 61, a speed sensor 62, a fuel level sensor 63, and a cap sensor 64.

In the present embodiment, the fuel vapor processing system 10 includes a tank passage member 210, a purge passage member 220, and an air passage member 230. The tank passage member 210, the purge passage member 220, and the air passage member 230 are formed of, e.g., a metal, and have tubular shapes.

The tank passage member 210 has one end connected to the opening 14 of the fuel tank 11. The tank passage 21 is defined in the tank passage member 210. Thus, one end of the tank passage 21 is in communication with the tank space 111 of the fuel tank 11 through the opening 14. Thus, fuel vapors generated in the fuel tank 11 flow into the tank passage 21 through the opening 14.

The canister 30 includes a case 31 and an absorber 32. The case 31 is formed of a resin and has a box shape. The case 31 defines case openings 311, 312, 313. The inside of the case 31 is in fluid communication with the outside of the case 31 through the case openings 311, 312, 313.

The absorber 32 is housed in the case 31. The case openings 311 and the case opening 312 are formed on a side of the absorber 32 opposite to the case opening 313. The absorber 32 is housed in the case 31 at a position close to the case opening 313. Thus, a space 33 is formed in the case 31 at a position close to the case openings 311, 312. The case opening 311 is in fluid communication with the case opening 312 through the space 33. Therefore, flow resistance in a region of the canister 30 between the case opening 311 and the case opening 312 (i.e., the space 33) is substantially zero, in other words, equal to or less than a specified value.

The case opening 311 of the canister 30 is connected to the other end of the tank passage member 210. Therefore, the other end of the tank passage 21 is in fluid communication with an inside of the case 31 through the case opening 311. As a result, fuel vapors generated in the fuel tank 11 flow into the inside (the space 33) of the case 31 of the canister 30 through the opening 14, the tank passage 21, and the case opening 311.

The absorber 32 is, for example, an activated carbon and is configured to absorb the fuel vapors. Therefore, the absorber 32 can absorb the fuel vapors that are generated in the fuel tank 11 and flow into the inside (the space 33) of the case 31 through the case opening 311.

The purge passage member 220 has one end connected to the case opening 312 of the canister 30 and the other end connected to the opening of the intake passage 3. The purge passage 22 is formed in the purge passage member 220. As a result, the one end of the purge passage 22 is in fluid communication with the inside (the space 33) of the case 31 of the canister 30 through the case opening 312. The other end of the purge passage 22 is in fluid communication with the intake passage 4 through the opening of the intake pipe 3. Thus, the fuel vapors in the space 33 of the canister 30 are introduced into the intake passage 4 through the purge passage 22.

The air passage member 230 has one end connected to the case opening 313 of the canister 30 and the other end open toward the atmosphere. The air passage 23 is defined in the air passage member 230. Thus, one end of the air passage 23 is in fluid communication with the inside of the case 31 through the case opening 313. The other end of the air passage 23 is open toward the atmosphere.

The fuel vapors that flowed into the case 31 from the case opening 311 pass through the absorber 32 toward the case opening 313. At this moment, the fuel vapors are absorbed by the absorber 32. Therefore, the concentration of the fuel vapors contained in air discharged into the atmosphere from the air passage 23 has a value equal to or less than a specified concentration.

In the present embodiment, flow resistance of a ventilation passage fr formed of the tank passage 21, the canister 30, and the air passage 23 is equal to or greater than a specified value due to the existence of the absorber 32 disposed in the case 31 of the canister 30. Hereinafter, the flow resistance of the ventilation passage fr is denoted by "pr".

In the present embodiment, the tank passage 21 includes a specified portion sp1. The specified portion sp1 is positioned lower in the vertical direction than a first imaginary plane hp1 on which the one end of the tank passage 21 is positioned and a second imaginary plane hp2 on which the other end of the tank passage 21 is positioned in a state where the fuel vapor processing system 10 is installed in the vehicle 1 (see FIG. 1). As a result, liquefied fuel vapors and foreign substances are easily accumulated in the specified portion sp1. Thus, the tank passage 21 may be clogged at, especially, the specified portion sp1.

The purge valve 41 is disposed in the pure passage member 220 to selectively open and close the purge passage 22. In the present embodiment, the purge valve 41 is closed when not energized. In other words, the purge valve 41 is a so-called normal closed type valve.

The air valve 42 is disposed in the air passage member 230 to selectively open and close the air passage 23. In the present embodiment, the air valve 42 is opened when not energized. In other words, the air valve 42 is a so-called normal open type valve.

The ECU 50 is a microcomputer including a CPU as processing means, a ROM, RAM, and EEPROM as memory means, and an I/O as interface means. The ECU 50 computes according to programs stored in the ROM to control operation of devices and equipment of the vehicle 1 based on information contained in signals from sensors coupled with the vehicle 1.

The ECU 50 includes, as conceptual functions, a controller 51, a fuel vapor processing portion 52, a fuel refill detecting portion 53, and an abnormality detecting portion 54.

The controller 51 is configured to control the throttle valve 5, the fuel pump 6, and the fuel injector based on information of signals from the sensors. More specifically, the controller 51 controls an amount of an intake air to be taken into the engine 2, an amount of fuel to be supplied to the fuel injector from the fuel tank 11, and an amount of fuel to be supplied to the engine 2 from the fuel injector.

The controller 51 further controls operation of the purge valve 41 and the air valve 42. Thus, the controller 51 can change an open state and a closed state of each of the purge passage 22 and the air passage 23.

The fuel vapor processing portion 52 causes the controller 51 to operate the purge valve 41 to open the purge passage 22 when the fuel vapor processing portion 52 estimates that an amount of the fuel vapors absorbed by the canister 30 is equal to or greater than a specified value during operation of the engine 2, in other words, when an intake air is flowing through the intake passage 4. At this moment, the air valve 42 is controlled to open the air passage 23. As a result, a negative pressure generates in the purge passage 22 at a position close to the intake passage 4. Thus, the fuel vapors absorbed by the absorber 32 of the canister 30 and the fuel vapors in the space 33 are discharged (purged) into the intake passage 4 through the purge passage 22. In this way, the fuel vapor processing portion 52 can control the operation of the purge valve 41 through the controller 51 and process the fuel vapors by discharging the fuel vapors into the intake passage 4.

The pressure sensor 61 is disposed in the tank body 110, detects a pressure in the fuel tank 11, and outputs a signal according to the detected pressure to the ECU 50. Therefore, the ECU 50 can obtain a pressure of the fuel tank 11. The pressure sensor 61 is positioned above the tank body 110 in the vertical direction when the fuel tank 11 is installed on the vehicle 1. As a result, the pressure sensor 61 can detect a pressure in an upper space 112 of the fuel tank 11 that is a space not filled with the fuel.

The speed sensor 62 is disposed in a portion of the vehicle 1 close to a wheel (not shown). The speed sensor 62 detects a speed of the vehicle 1, i.e., a vehicle speed, and outputs a signal according to the detected vehicle speed to the ECU 50. As a result, the ECU 50 can obtain the speed of the vehicle 1.

The fuel level sensor 63 is disposed in the fuel pump 6. The fuel level sensor 63 includes, e.g., an elongated arm, a float attached to one end of the arm, a detector disposed in the other end of the arm and fixed to the fuel pump 6. The float is configure to be float on a liquid level of the fuel, whereby the position of the float in the vertical direction varies according to the amount of the fuel in the fuel tank 11. When the position of the float varies in the vertical direction, the rotational position of the arm is changed. The detector outputs a signal according to the rotational position of the arm to the ECU 50. That is, the fuel level sensor 63 detects the amount of the fuel in the fuel tank 11, and outputs the signal according to the detected amount of the fuel to the ECU 50. As a result, the ECU 50 can obtain an amount of the fuel in the fuel tank 11.

The cap sensor 64 is disposed in a position close to the tank cap 13. The cap sensor 64 detects an open state or a closed state of the tank cap 13 and outputs a signal according to the detected state of the tank cap 13 to the ECU 50. As a result, the ECU 50 can obtain the open state or the closed state of the tank cap 13.

The fuel refill detecting portion 53 detects that "fuel refill to the fuel tank 11 is started" or "fuel refill to the fuel tank 11 is being performed" by executing a fuel refill detecting process. More specifically, the fuel refill detecting portion 53 executes the fuel refill detecting process when the vehicle speed of the vehicle 1 detected by the speed sensor 62 is zero, and when the cap sensor 64 detects the open state of the tank cap 13. That is, the fuel refill detecting portion 53 executes the fuel refill detecting process when the vehicle 1 is stopped and when the tank cap 13 is in the open state and the tank opening 12 is open.

The fuel refill detecting portion 53 can detect that "fuel refill to the fuel tank 11 is started" or "fuel refill to the fuel tank 11 is being performed" in the fuel refill detecting process based on the signal from the fuel level sensor 63. More specifically, the fuel refill detecting portion 53 detects "fuel refill to the fuel tank 11 is started" when the fuel refill detecting portion 53 detects that the amount of the fuel in the fuel tank 11 starts increasing based on the signal from the fuel level sensor 63. The fuel refill detecting portion 53 detects "fuel refill to the fuel tank 11 is being performed" when the fuel refill detecting portion 53 detects that the amount of the fuel in the fuel tank 11 continuously increases based on the signal from the fuel level sensor 63.

When fuel is being refilled into the fuel tank 11, the amount of the fuel in the fuel tank 11 increases, whereas the volume of the upper space 112 of the fuel tank 11 decreases. Thus, air in the upper space 112 flows toward the atmosphere through the ventilation passage fr.

When the tank passage 22 is opened, the pressure in the upper space 112 is substantially the same as the flow resistance pr of the ventilation passage fr when a certain time period elapses after starting the fuel refill. On the contrary, when the tank passage 21 is clogged with fuel or foreign substances, the pressure in a region between the clogged portion and one side close to the fuel tank 11 increases during the fuel refill, whereas the pressure in a region between the clogged portion and the other side away from the fuel tank 11 does not increase during the fuel refill.

The abnormality detecting portion 54 detects, by executing an abnormality detecting process, "a clogged situation where the tank passage 21 is clogged" based on the signal from the pressure sensor 61 received after the fuel refill detecting portion 53 detected that "the fuel refill to the fuel tank 11 was started". More specifically, the abnormality detecting portion 54 executes the abnormality detecting process in a state where the purge passage 22 is closed by the purge valve 41 and the air passage 23 is opened by the air valve 42.

The abnormality detecting portion 54 detects the clogged situation in the abnormality detecting process when the pressure detected by the pressure sensor 61 increases after a first time period T1 elapsed from when the fuel refill detecting portion 53 detected that "the fuel refill to the fuel tank 11 was started" but before a second time period Tth1 elapses from when the first time period elapsed.

Furthermore, the abnormality detecting portion 54 detects the clogged situation in the abnormality detecting process when the pressure detected by the pressure sensor 61 continuously increases for a third time period Tth2.

The abnormality detecting portion 54 detects the clogged situation in the abnormality detecting process when the pressure detected by the pressure sensor 61 is equal to or greater than a reference value pth. The reference value pth is set to be a value less than the flow resistance pr in the ventilation passage fr, and greater than atmospheric pressure.

The abnormality detecting portion 54 sets the first time period T1 based on an amount of the fuel in the fuel tank 11. Specifically, the abnormality detecting portion 54 sets the first time period T1 such that the first time period T1 increases as the amount of the fuel in the fuel tank 11 detected by the fuel level sensor 64 decreases, whereas the first time period T1 decreases as the detected amount of the fuel in the fuel tank 11 increases. In this way, the first time period T1 is set according to the amount of the fuel in the fuel tank 11, in other words "a time when the pressure in the upper space 112 reaches substantially the same value of the flow resistance pr of the upper space 112 after the fuel refill was started". Therefore, it is possible to avoid determining whether "the pressure increases" during a time period after the fuel refill was started and before the pressure in the upper space 112 reaches substantially the same value of the flow resistance pr. As a result, accuracy of detecting the clogged situation can be improved.

In the present embodiment, both the second time period Tth1 and the third time period Tth2 are set to be 10 seconds, for example.

The abnormality detecting portion 54 detects the clogged situation in the abnormality detecting process based on the signal from the fuel level sensor 63 and the signal from the pressure sensor 61. More specifically, the abnormality detecting portion 54 detects the clogged situation by determining whether the pressure in the upper space 112 increases as an amount of the fuel in the fuel tank 11 increases during fuel refill. For example, if fuel refill is temporarily suspended, there is a concern that the abnormality detecting portion 54 may determine that the operation is normal even if the clogged situation actually occurs, since the pressure in the upper space 112 does not increase during the suspension of the fuel refill. However, the abnormality detecting portion 54 according to the present embodiment determines whether the pressure in the upper space 112 increases in accordance with an increase in the amount of the fuel in the fuel tank 11, as described above. Therefore, the clogged situation can be surely detected when the clogged situation actually occurs.

Figure 2:
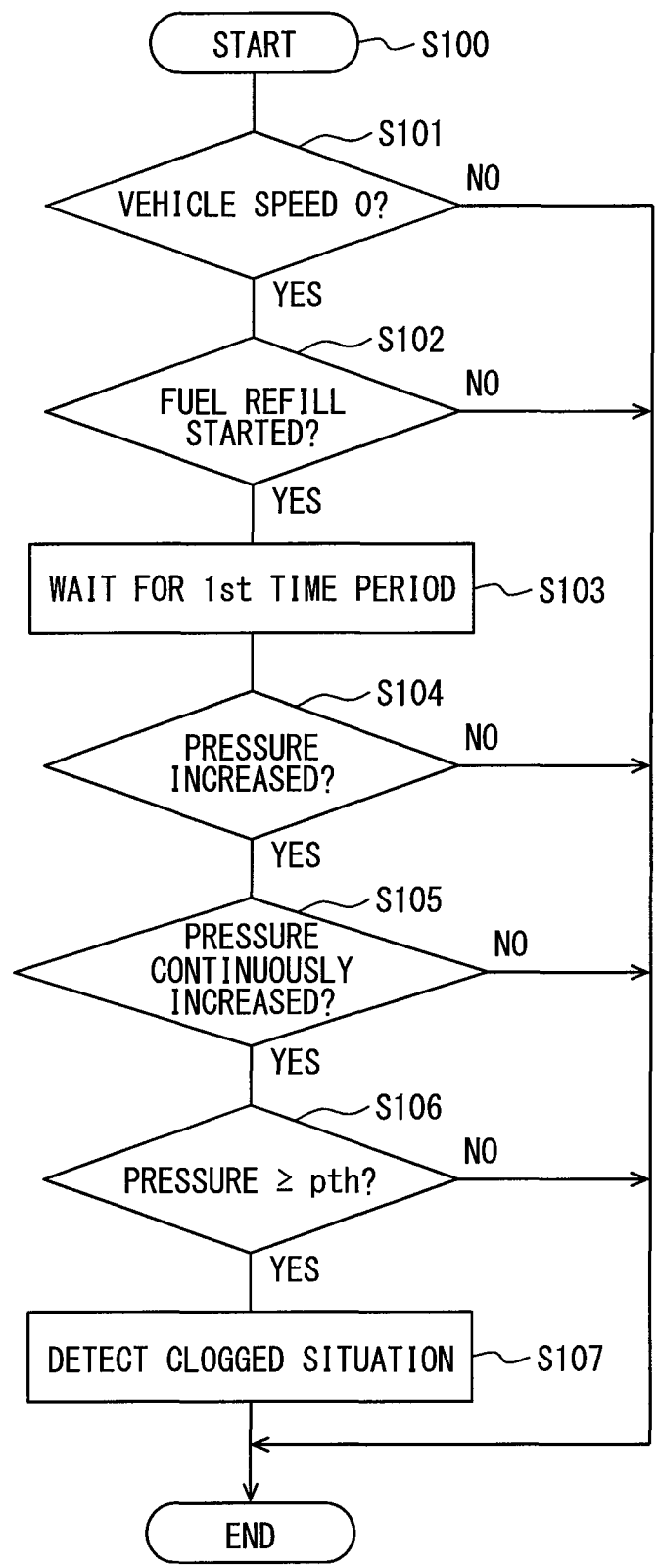
FIG. 2 is a flowchart of a fuel refill detecting process and an abnormality detecting process by the fuel vapor processing system.

Next, the fuel refill detecting process and the abnormality detecting process executed by the ECU 50 will be described with reference to FIG. 2. The entire process of Step 100 shown in FIG. 2 will be repeated at specified timings regardless of an on/off state of an ignition key.

At Step 101, the ECU 50 determines whether a speed of the vehicle 1, i.e., a vehicle speed, is zero based on the signal from the speed sensor 62. When true at Step 101 (YES), the process moves forward to Step 102. On the other hand, when false at Step 101 (NO), the process terminates.

At Step 102, the ECU 50 determines whether fuel refill to the fuel tank 11 is started based on the signals from the cap sensor 64 and the fuel level sensor 63. When true at Step 102 (YES), the process proceeds to Step 103. On the contrary, when false at Step 102 (NO), the process terminates.

At Step 103, the ECU 50 waits for elapse of the first time period T1. Thereafter, the process proceeds to the Step 104.

At Step 104, the ECU 50 determines whether the pressure detected by the pressure sensor 61 increased during the second time period Tth1. Specifically, the ECU 50 determines that the pressure increased when the pressure at the time of termination of the second time period Tth1 is greater than the pressure at the time of commencement of the second time period Tth1. When true at Step 104 (YES), the process proceeds to Step 105. On the contrary, when false at Step 104 (NO), the process terminates.

At Step 105, the ECU 50 determines whether the pressure detected by the pressure sensor 61 continuously increases during the third time period Tth2 (equal to the second time period Tth1 in this embodiment). When true at Step 105 (YES), the process proceeds to Step 106. On the contrary, when false at Step 105 (NO), the process terminates.

At Step 106, the ECU 50 determines whether the pressure detected by the pressure sensor 61 is equal to or greater than the reference value pth. When true at Step 106 (YES), the process proceeds to Step 107. On the contrary, when false at Step 106 (NO), the process terminates.

At Step 107, the ECU 50 detects the clogged situation where "the tank passage 21 is clogged", i.e., "the abnormality where the tank passage 21 is clogged". When the ECU 50 detects the clogged situation, the ECU 50 notifies the driver of "the occurrence of the clogged situation in the tank passage 21" by, for example, turning on a warning lamp of a display device disposed in a front position of the driver seat of the vehicle 1.

After Step 107, the process terminates.

In this way, the ECU 50 functions as the fuel refill detecting portion 53 at Step 102 and executes the fuel refill detecting process. Further, the ECU 50 functions as the abnormality detecting portion 54 at Steps 103 to 107, and executes the abnormality detecting process.

Figure 3:
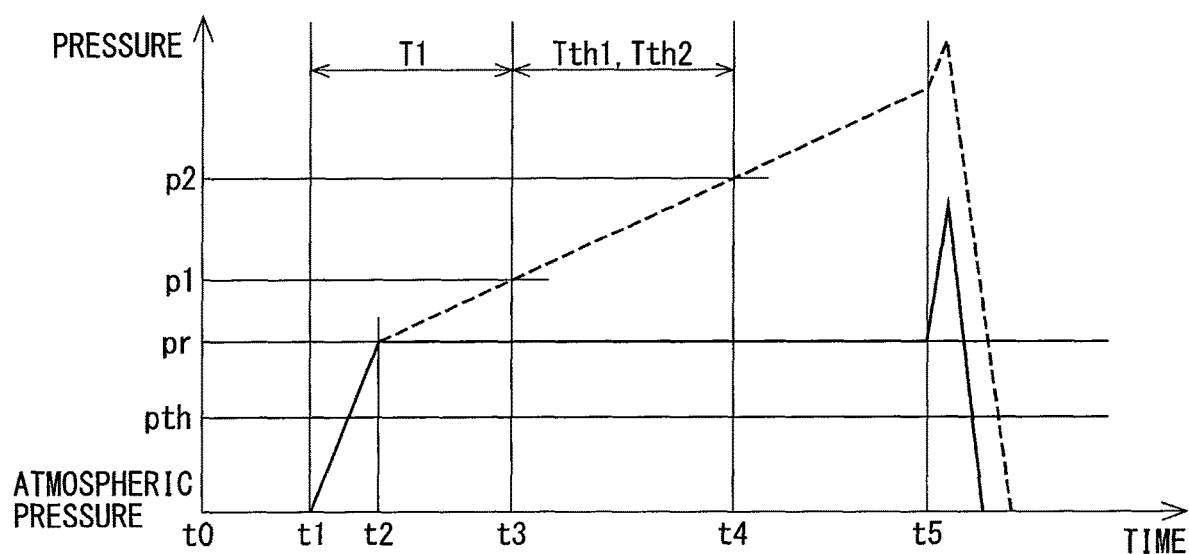
FIG. 3 is a diagram illustrating an operational example of the fuel vapor processing system.

Next, operational examples as to the fuel refill detecting process and the abnormality detecting process by the fuel vapor processing system 10 will be described with reference to FIG. 3.

Initially, an example of a normal operation where the clogged situation does not occur in the tank passage 21 will be described. The solid line in FIG. 3 shows a change in a pressure of the upper space 112 of the fuel tank 11 based on the signal from the pressure sensor 61.

The vehicle 1 stops at time t0. In this case, when the vehicle speed becomes zero, the ECU 50 (the fuel refill detecting portion 53) initiates the fuel refill detecting process based on the signal from the speed sensor 62. Then, the engine 2 is completely stopped when the ignition key is turned off. Next, the tank cap 13 is opened, and the tank opening 12 is in the open state. In this case, since the tank cap 13 is in the open state, the ECU 50 (the fuel refill detecting portion 53) continues the fuel refill detecting process. At this moment, the pressure in the upper space 112 of the fuel tank 11 is substantially the same as atmospheric pressure.

Next, a fuel nozzle 90 is inserted into the tank opening 12, and fuel refill is started at time t1, and thus an amount of the fuel in the fuel tank 11 starts increasing. The ECU 50 (the fuel refill detecting portion 53) detects "fuel refill to the fuel tank 11 is started" based on the signal from the fuel level sensor 63. The ECU 50 (the abnormality detecting portion 54) starts the abnormality detecting process. The ECU 50 (the abnormality detecting portion 54) sets the first time period T1 based on the amount of the fuel in the fuel tank 11 detected by the fuel level sensor 63.

In this example (the solid line in FIG. 3), the clogged situation in the tank passage 21 does not occur. Therefore, the upper space 112 of the fuel tank 11 decreases as the fuel refill through the fuel nozzle 90 continues from the time t1, and thus an air in the upper space 112 flows through the ventilation passage fr toward the atmosphere. In this case, the pressure in the upper space 112 increases.

At the time t2, the pressure in the upper space 112 reaches the flow resistance pr. Since the clogged situation does not occur in this example, an air in the upper space 112 flows through the ventilation passage fr toward the atmosphere even when the fuel refill continues after the time t2. As a result, the pressure in the upper space 112 has a constant value (the flow resistance pr).

At time t3 when the first time period T1 elapsed from the time t1, the ECU 50 (the abnormality detecting portion 54) stores the pressure value (the flow resistance pr) detected by the pressure sensor 61. The ECU 50 (the abnormality detecting portion 54) repeatedly stores the pressure value (the flow resistance pr) detected by the pressure sensor 61 at specified timings after the time t3.

At time t4 when the second time period Tth1 (the third time period Tth2) elapsed from the time t3, the ECU 50 (the abnormality detecting portion 54) compares the pressure (the flow resistance pr) detected at the time t3 with the pressure (the flow resistance pr) detected at the time t4. Then, the ECU 50 determines whether the pressure increased during the second time period Tth1 (i.e., from the time t3 to the time t4). Further, the ECU 50 determines whether the pressure continuously increased during the third time period Tth2 (i.e., from the time t3 to the time t4). In this example (the solid line in FIG. 3), the pressure does not increase during the second time period Tth1, and the pressure does not continuously increase during the third time period Tth2. Therefore, the ECU 50 determines that "the tank passage 21 is not clogged", i.e., the tank passage 21 is in a normal state.

When the fuel tank 11 is full at time t5, the opening 14 is closed by the fuel level valve 15. Thus, although the pressure in the upper space 112 of the fuel tank 11 temporarily increases after the time t5, the pressure in the upper space 112 will decrease to the atmospheric pressure when the fuel refill from the fuel nozzle 90 is finished.

Next, an example of an abnormal operation where the clogged situation occurs in the tank passage 21 will be described. The broken line in FIG. 3 shows a change in the pressure of the upper space 112 of the fuel tank 11 based on the signal from the pressure sensor 61.

The description until the time t1 is the same as the above normal operation, and thus will be omitted.

In this example (the broken line in FIG. 3), the clogged situation in the tank passage 21 occurs. Therefore, the upper space 112 of the fuel tank 11 decreases as the fuel refill through the fuel nozzle 90 continues from the time t1, but an air in the upper space 112 does not flow through the ventilation passage fr toward the atmosphere. In this case, the pressure in the upper space 112 increases as with the normal operation as described above.

At the time t2, the pressure in the upper space 112 reaches the flow resistance pr. Since the clogged situation occurs in this example, the pressure in the upper space 112 continues to increase as the fuel refill continues even after the time t2.

At time t3 when the first time period T1 elapsed from the time t1, the ECU 50 (the abnormality detecting portion 54) stores the pressure p1 detected by the pressure sensor 61. The ECU 50 (the abnormality detecting portion 54) repeatedly stores the pressure value detected by the pressure sensor 61 at specified timings after the time t3.

At time t4 when the second time period Tth1 (the third time period Tth2) elapsed from the time t3, the ECU 50 (the abnormality detecting portion 54) compares the pressure (p1) detected at the time t3 with the pressure (p2) detected at the time t4. Then, the ECU 50 determines whether the pressure increased during the second time period Tth1 (i.e., from the time t3 to the time t4). Further, the ECU 50 determines whether the pressure detected by the pressure sensor 61 continuously increased during the third time period Tth2 (i.e., from the time t3 to the time t4). In this example (the broken line in FIG. 3), the pressure increases during the second time period Tth1, and the pressure continuously increases during the third time period Tth2. Therefore, the ECU 50 determines that "the tank passage 21 is clogged" and detects the clogged situation.

When the fuel tank 11 is full at time t5, the opening 14 is closed by the fuel level valve 15. Thus, although the pressure in the upper space 112 of the fuel tank 11 temporarily increases after the time t5, the pressure in the upper space 112 will decrease to the atmospheric pressure when the fuel refill from the fuel nozzle 90 is finished.

In the present embodiment, the abnormality detecting portion 54 detects an releasing situation where "fuel vapors are released out of the fuel tank 11, the tank passage 21, the canister 30, the purge passage 22, or the air passage 23" based on the signal from the pressure sensor 61 received after the engine 2 was stopped and the purge passage 41 and the air passage 23 were closed by the purge valve 41 and the air valve 42, respectively, through the controller 51.

More specifically, the abnormality detecting portion 54 causes the controller 51 to control the purge valve 41 and the air valve 42 to close the purge passage 22 and the air passage 23, respectively, after the vehicle 1 traveled for a specified time and then the engine 2 was stopped. Thus, the upper space 112 is in a tightly closed state, and a temperature in the fuel tank 11 is increased due to heat from the engine 2 having a high temperature after the travel. As a result, the pressure in the upper space 112 increases in a normal condition.

The abnormality detecting portion 54 determines whether the pressure detected by the pressure sensor 61 is equal to or the pressure is greater than atmospheric pressure after a specified time period elapsed since the purge passage 22 and the air passage 23 were closed. Then, if the pressure detected by the pressure sensor 61 is substantially equal to the atmospheric pressure, the abnormality detecting portion 54 detects the releasing situation. On the contrary, the pressure detected by the pressure sensor 61 is greater than the atmospheric pressure, the abnormality detecting portion 54 does not detect the releasing situation (i.e., detects a normal operation).

In this way, the abnormality detecting portion 54 can detect the releasing situation in addition to the clogged situation.

As described above, the fuel vapor processing system 10 includes the tank passage 21, the canister 30, the purge passage 22, the air passage 23, the purge valve 41, the controller 51, the fuel vapor processing portion 52, the pressure sensor 61, the fuel refill detecting portion 53, and the abnormality detecting portion 54.

The tank passage 21 has the one end connected to the fuel tank 11 storing fuel. The canister 30 absorbs fuel vapors generated from the fuel in the fuel tank 11 by evaporating. The canister 30 is connected to the other end of the tank passage 21.

The purge passage 22 has the one end connected to the canister 30 and the other end connected to the intake passage 4 of the engine 2 of the vehicle 1.

The air passage 23 has the one end connected to the canister 30 and the other end open toward an atmosphere. The purge valve 41 selectively opens and closes the purge passage 22.

The controller 51 controls operation of the purge valve 41.

The fuel vapor processing portion 52 discharges the fuel vapors into the intake passage 4 by controlling the purge valve 41 through the controller 51.

The pressure sensor 61 detects a pressure in the fuel tank 11 and outputs a signal according to the detected pressure.

The fuel refill detecting portion 53 detects that fuel refill to the fuel tank 11 is started or fuel refill to the fuel tank is being performed by executing the fuel refill detecting process (S102).

The abnormality detecting portion 54 detects, by executing the abnormality detecting process (S103 to S107), the clogged situation where the tank passage 21 is clogged based on the signal from the pressure sensor 61 received after the fuel refill detecting portion 53 detected that the fuel refill to the fuel tank 11 was started.

An amount of fuel in the fuel tank 11 increases during fuel refill to the fuel tank 11, whereas the volume of the upper space 112 decreases. Hence, an air in the upper space 112 flows through the ventilation passage fr toward the atmosphere. When the tank passage 21 is clogged with fuel or foreign substances, the pressure in a region between the clogged portion and one side close to the fuel tank 11 (e.g., a space between the clogged portion and the fuel tank 11) increases during the fuel refill, whereas the pressure in a region between the clogged portion and the other side away from the fuel tank 11 (e.g., a space downstream of the clogged portion) does not increase during the fuel refill.

In the present embodiment, the pressure sensor 61 is disposed in the fuel tank 11, and the clogged situation can be detected after the fuel refill detecting portion 53 detected that fuel refill to the fuel tank 11 was started, in other words, based on the signal from the pressure sensor 61 during the fuel refill.

Therefore, the clogged situation can be detected in view of pressure change of the upper place 112 due to the fuel refill to the fuel tank 11. Accordingly, the signal output from the pressure sensor 61 can be stable as compared to a situation where the clogged situation is detected using a negative pressure of an intake air. Thus, accuracy of detecting the clogged situation can be improved.

The abnormality detecting portion 61 detects the clogged situation in the abnormality detecting process when the pressure detected by the pressure sensor 61 increases after the first time period T1 elapsed from when the fuel refill detecting portion 53 detected that the fuel refill to the fuel tank 11 was started, until the second time period Tth1 elapses from when the first time period T1 elapsed.

The abnormality detecting portion 54 detects the clogged situation in the abnormality detecting process when the pressure detected by the pressure sensor 61 continuously increases during the third time period Tth2. Thus, an error of falsely detecting the clogged situation can be suppressed.

The abnormality detecting portion 54 detects the clogged situation in the abnormality detecting process when the pressure detected by the pressure sensor 61 is equal to or greater than the reference value pth. Thus, an error of falsely detecting the clogged situation can be suppressed.

The reference value pth is set to be a value less than the flow resistance pr in the ventilation passage fr. Therefore, accuracy of detecting the clogged situation can be improved.

The tank passage 21 includes the specified portion sp1 that is positioned, in a state where the tank passage 21 is installed in the vehicle 1, lower in the vertical direction than the first imaginary plane hp1 on which the one end of the tank passage 21 is positioned and the second imaginary plane hp2 on which the other end of the tank passage 21 is positioned. Liquefied fuel vapors and foreign substances are likely accumulated in the specified portion sp1. Thus, the tank passage 21 may be easily clogged at the specified portion sp1. Hence, the present embodiment is suitable for such a system having the tank passage 21 with the specified portion sp1.

The abnormality detecting portion 54 sets the first time period T1 based on an amount of the fuel in the fuel tank 11. Thus, it is possible to avoid determining whether the pressure increases during a time period before the pressure in the upper space 112 reaches substantially the same pressure of the flow resistance pr and after the fuel refill was started. As a result, accuracy of detecting the clogged situation can be improved.

The speed sensor 62 detects a vehicle speed. The speed sensor 62 outputs a signal according to the detected vehicle speed. The fuel refill detecting portion 53 executes the fuel refill detecting process when the vehicle speed detected by the speed sensor 62 is zero. Thus, an error of falsely detecting fuel refill can be suppressed.

The fuel level sensor 63 detects an amount of the fuel in the fuel tank 11. The fuel level sensor 63 outputs a signal according to the detected amount of the fuel. The fuel refill detecting portion 53 detects, based on the signal from the fuel level sensor, that fuel refill to the fuel tank 11 is started or fuel refill to the fuel tank 11 is being performed in the fuel refill detecting process. Therefore, accuracy of detecting fuel refill can be improved.

The abnormality detecting portion 54 detects the clogged situation based on the signal from the fuel level sensor 63 and the signal from the pressure sensor 61. Thus, even when fuel refill is temporarily suspended during the abnormality detecting process, the clogged situation can be accurately detected.

The cap sensor 64 detects an open state and a closed state of the fuel cap 13 and outputs a signal corresponding the detected state of the fuel cap 13. The fuel refill detecting portion 53 is configured to execute the refill detecting process when the cap sensor 64 detects the open state of the fuel cap 13. Thus, an error of falsely detecting fuel refill can be suppressed.

The air valve 42 selectively opens and closes the air passage 23. The releasing situation is defined a situation where the fuel vapors are released out of the fuel tank 11, the tank passage 21, the canister 30, the purge passage 22, or the air passage 23. The abnormality detecting portion 54 detects the releasing situation based on the signal from the pressure sensor 61 after the engine 2 was stopped and the purge passage 22 and the air passage 23 were closed by the purge valve 41 and the air valve 42, respectively, through the controller 51. Thus, the fuel vapor processing system 10 can detect the releasing situation in addition to the clogged situation by the abnormality detecting portion 54.

Second Embodiment

A fuel vapor processing system according to a second embodiment will be described with reference to FIGS. 4 and 5. In the second embodiment, the abnormality detecting process by the ECU 50 is different from in the first embodiment.

It should be noted that the structure of the second embodiment is substantially the same of the first embodiment.

Figure 4:
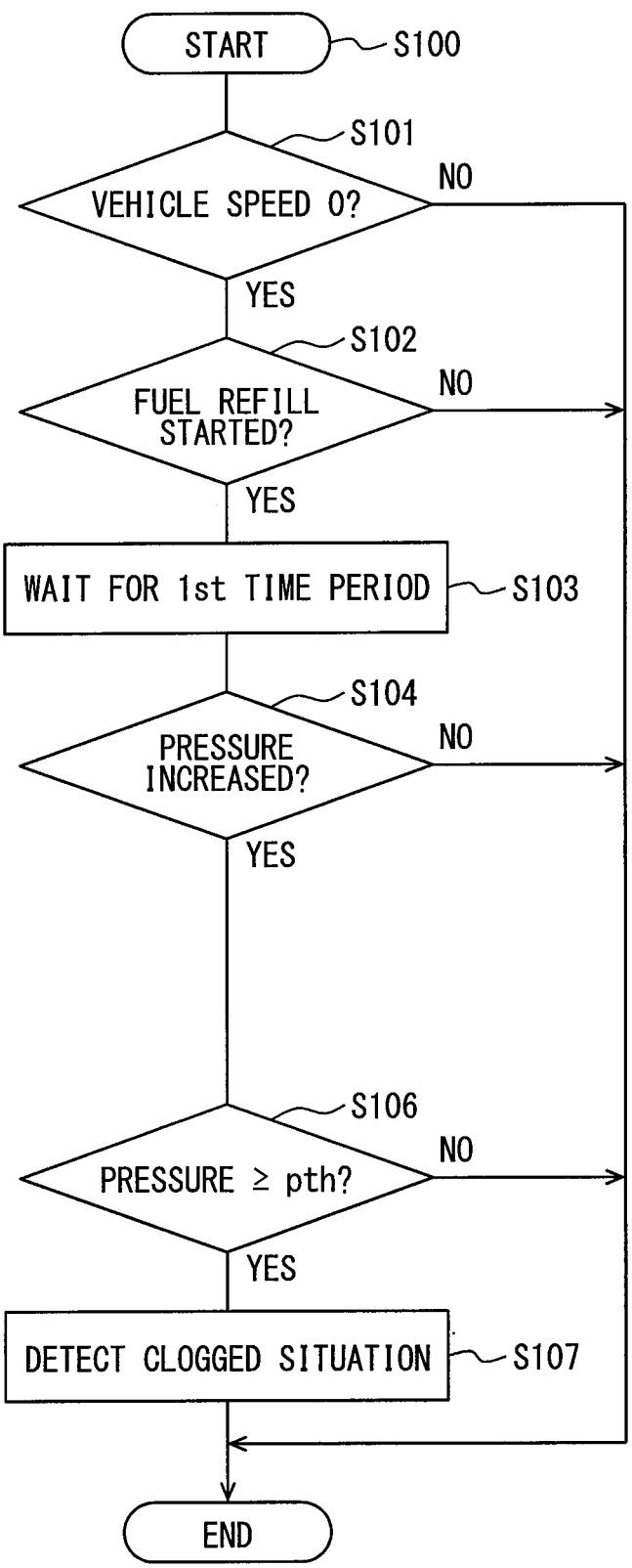
FIG. 4 is a flowchart of a fuel refill detecting process and an abnormality detecting process by the fuel vapor processing system according to a second embodiment.
Figure 5A:
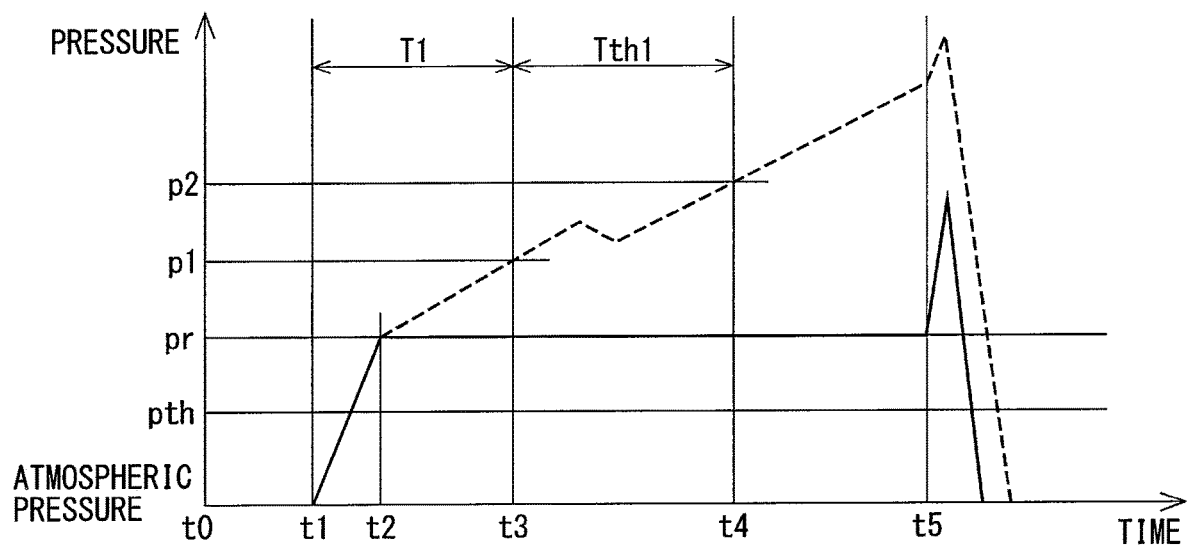
FIG. 5A is a diagram illustrating an operational example of the fuel vapor processing system according to the second embodiment.

FIG. 4 shows the refill detecting process and the abnormality detecting process according to the second embodiment which are performed by the ECU 50.

As shown in FIG. 4, the process of Steps 100 (see FIG. 2) to 105 as shown in the first embodiment is eliminated in the second embodiment. When true at Step 104 (YES), the process proceeds to Step 106.

In the second embodiment, the process "to determine whether the pressure detected by the pressure sensor 61 continuously increases during the third time period Tth2" is eliminated from the series of the process denoted by Step 100 in FIG. 4. Therefore, as indicated by the broken line in FIG. 5A, for example, even when a pressure in the upper space 112 does not continuously increases during the second time period Tth1 (i.e., from the time t3 to the time t4), i.e., the increase in the pressure is temporarily stopped, the abnormality detecting portion 54 still detects an clogged situation "where the tank passage 21 is clogged" when the pressure restarts increasing again (p1<p2) until the second time period Tth1 elapses after the time t3 (i.e., from the time t3 to the time t4). This example (the broken line in FIG. 5A) may occur when the clogging is temporarily eliminated during the time period between the time t3 to the time t4, but resumes thereafter.

Figure 5B:
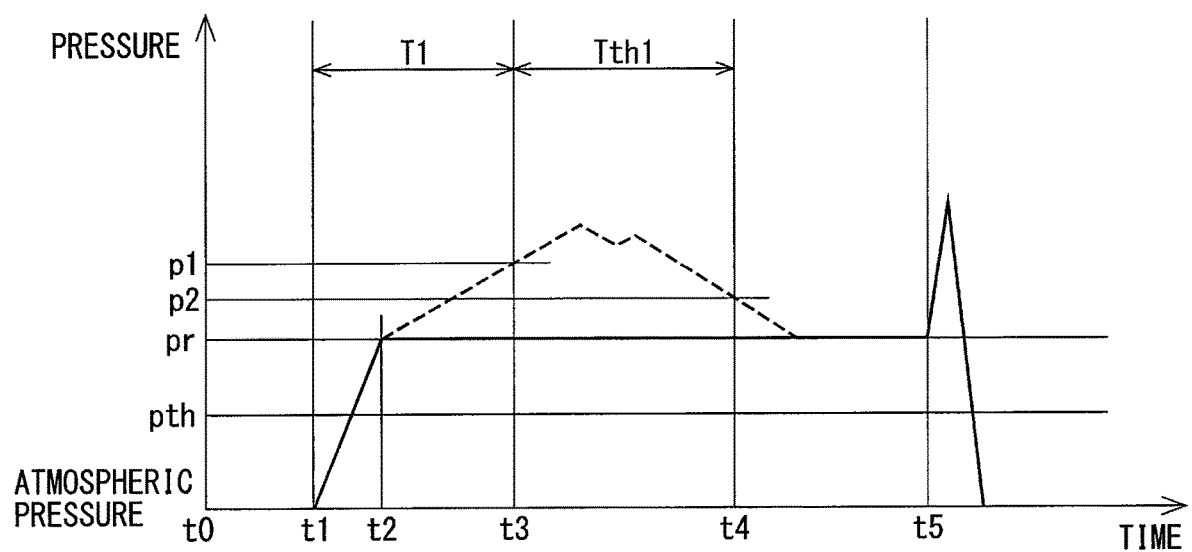
FIG. 5B is a diagram illustrating another operational example of the fuel vapor processing system according to the second embodiment.

Furthermore, as indicated by the broken line in FIG. 5B, when the pressure in the upper space 112 does not continuously increase during the second time period Tth1 (i.e., from the time t3 to the time t4) and also does not increase during the second time Tth1 (p1>p2), the abnormality detecting portion 54 does not detect the clogged situation and determines that the operation is normal. This situation (the broken line in FIG. 5B) may occur when the clogging of the tank passage 21 is eliminated between the time t3 to the time t4.

Third Embodiment

Figure 6:
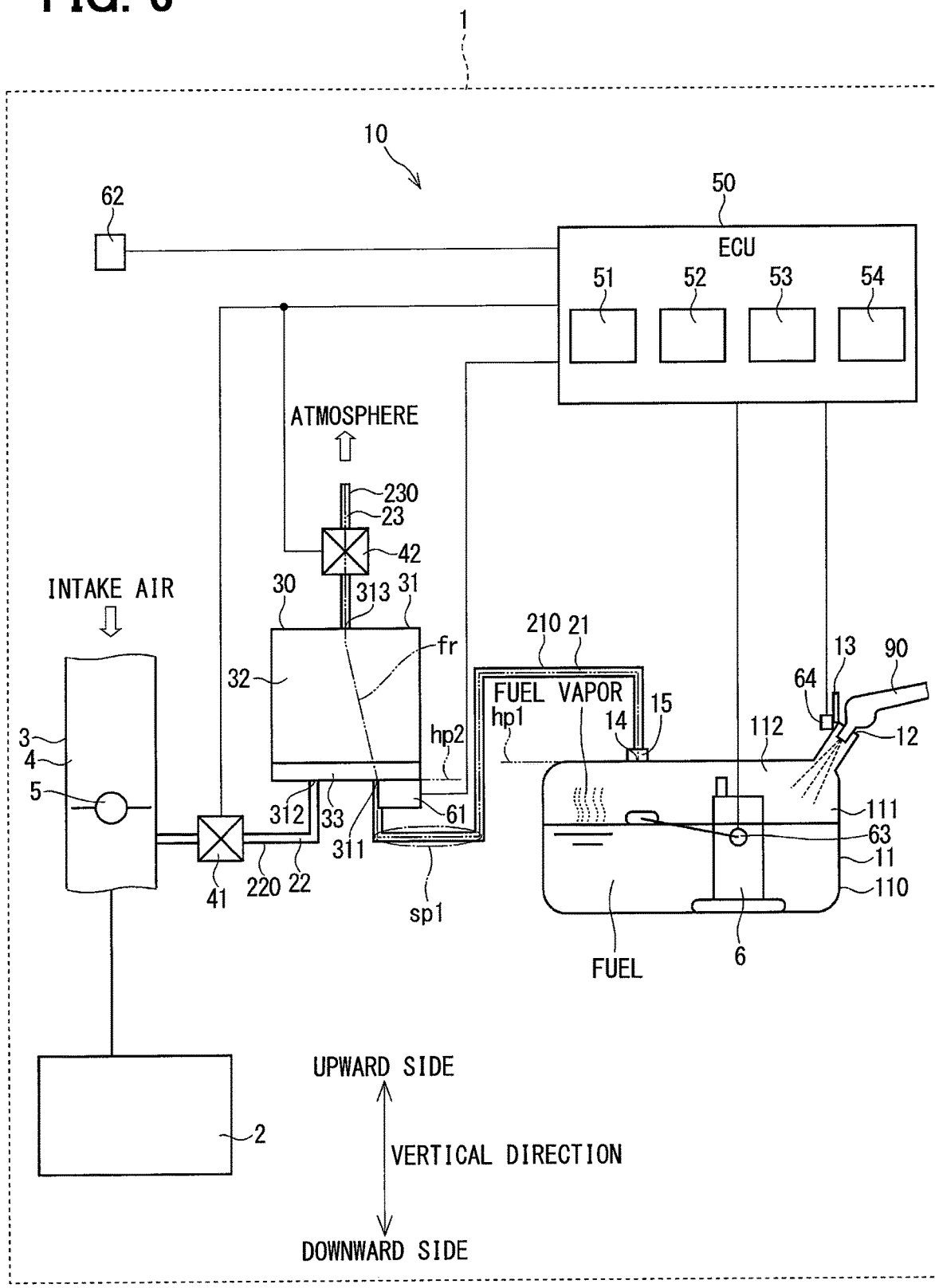
FIG. 6 is a schematic view of a fuel vapor processing system according to a third embodiment.

FIG. 6 shows a fuel vapor processing system according to a third embodiment. In the third embodiment, the arrangement of the pressure sensor 61 and the abnormality detecting process by the ECU 50 are different from the first embodiment.

In the third embodiment, the pressure sensor 61 is disposed in the tank passage member 210 to detect a pressure in the tank passage 21. The pressure sensor 61 outputs a signal according to the detected pressure to the ECU 50. Accordingly, the ECU 50 can obtain the pressure in the tank passage 21. The pressure sensor 61 is disposed to be in contact with or close to the canister 30. In other words, the pressure sensor 61 is disposed in the other end of the tank passage 21 to detect, especially, a pressure around the other end of the tank passage 21. In other words, the pressure sensor 61 detects a pressure on a side of the specified portion sp opposite to the fuel tank 11.

The structure other than the above-described structure in the third embodiment is similar to the first embodiment.

In the third embodiment, the abnormality detector 54 detects the clogged situation in the abnormality detecting process when the pressure detected by the pressure sensor 61 is less than the reference value pth after the first time period T1 elapsed from when the fuel refill detecting portion 53 detected that "fuel refill to the fuel tank 11 was started". The reference value pth is set to be a value less than flow resistance pr in the ventilation passage fr formed of the tank passage 21, the canister 30, and the air passage 23, and greater than atmospheric pressure.

As with the first embodiment, the abnormality detecting portion 54 sets the first time period T1 based on an amount of the fuel in the fuel tank 11.

Figure 7:
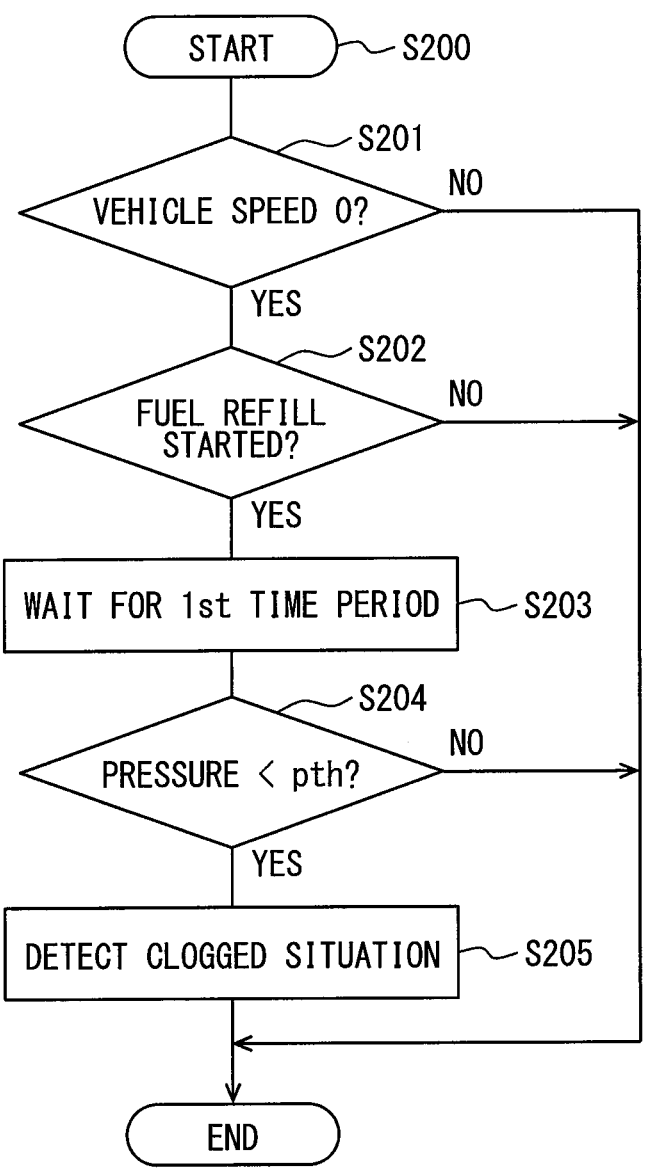
FIG. 7 is a flowchart of a fuel refill detecting process and an abnormality detecting process by the fuel vapor processing system according to the third embodiment.

Next, the fuel refill detecting process and the abnormality detecting process executed by the ECU 50 according to the third embodiment will be described with reference to FIG. 7. As with Step 100 in the first embodiment, the entire process of Step 200 shown in FIG. 7 will be repeated at specified timings regardless of an on/off state of an ignition key.

At Step 201, the ECU 50 determines whether a speed of the vehicle 1, i.e., a vehicle speed, is zero based on the signal from the speed sensor 62. When true at S201 (YES), the process moves forward to Step 202. On the other hand, when false at Step 201 (NO), the process terminates.

At Step 202, the ECU 50 determines whether fuel refill to the fuel tank 11 is started based on the signals from the cap sensor 64 and the fuel level sensor 63. When true at Step 202 (YES), the process proceeds to Step 203. On the contrary, when false at Step 202 (NO), the process terminates.

At Step 203, the ECU 50 waits for elapse of the above-described first time period T1. Thereafter, the process proceeds to the Step 204.

At Step 204, the ECU 50 determines whether the pressure detected by the pressure sensor 61 is less than the reference value pth. When true at Step 204 (YES), the process proceeds to Step 205. On the other hand, when false at Step 204 (NO), the process terminates.

At Step 205, the ECU 50 detects the clogged situation where "the tank passage 21 is clogged", i.e., detects "the abnormality where the tank passage 21 is clogged". When the ECU 50 detects the clogged situation, the ECU 50 notifies the driver of "the occurrence of the clogged situation in the tank passage 21" by, for example, turning on a warning lamp of a display device disposed in a front position of the driver seat of the vehicle 1, as with the first embodiment.

After Step 205, the process terminates.

In this way, the ECU 50 functions as the fuel refill detecting portion 53 at Step 202 and executes the fuel refill detecting process. Further, the ECU 50 functions as the abnormality detecting portion 54 at Steps 203 to 205, and executes the abnormality detecting process.

Figure 8:
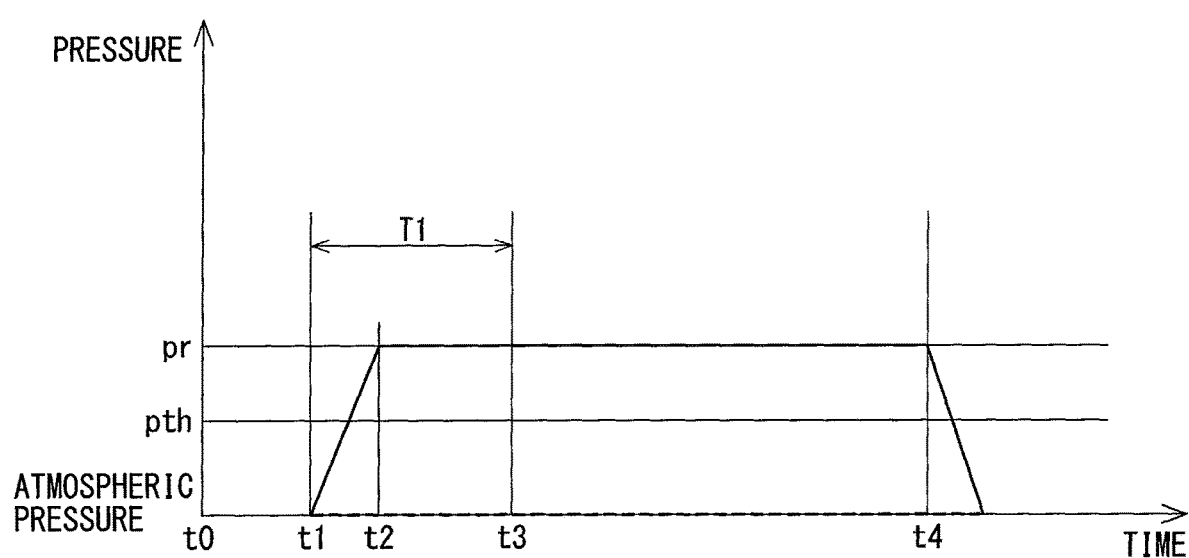
FIG. 8 is a diagram illustrating an operational example of the fuel vapor processing system according to the third embodiment.

Next, operational examples of the fuel refill detecting process and the abnormality detecting process by the fuel vapor processing system 10 according to the present embodiment will be described with reference to FIG. 8.

Initially, an example of a normal operation where the clogged situation does not occur in the tank passage 21 will be described. The solid line in FIG. 8 shows a change in the tank passage 21 based on the signal from the pressure sensor 61.

The process until the time t1 is the same as the normal operation in the first embodiment, and therefore its description will be omitted in the following.

In this example (the solid line in FIG. 8), the clogged situation in the tank passage 21 does not occur. Therefore, the upper space 112 of the fuel tank 11 decreases as the fuel refill through the fuel nozzle 90 continues from the time t1, and thus an air in the upper space 112 flows through the ventilation passage fr formed of the tank passage 21, the canister 30, and the air passage 23 toward the atmosphere. In this case, the pressure in the upper space 112 increases.

At the time t2, the pressures in the upper space 112 and the tank passage 21 reach the flow resistance pr. Since the clogged situation does not occur in this example, an air in the upper space 112 continues to flow through the ventilation passage fr toward the atmosphere even when the fuel refill continues after the time t2. As a result, the pressures in the upper space 112 and the tank passage 21 continue to have a constant value (the flow resistance pr).

At time t3 when the first time period T1 elapsed from the time t1, the ECU 50 (the abnormality detecting portion 54) compares the pressure (the flow resistance pr) detected by the pressure sensor 61 with the reference value pth, then determines whether the pressure detected is less than the reference value pth. Since, (the solid line in FIG. 8), the pressure detected (the flow resistance pr) is greater than the reference value pth in this example, the ECU 50 determines that "the portion of the tank passage 21 between the pressure sensor 61 and the fuel tank 11 is not clogged", i.e., the tank passage 21 is in a normal state.

When the fuel tank 11 is full at time t4, the opening 14 is closed by the fuel level valve 15. Thus, an air in the tank passage 21 flows toward the atmosphere through the canister 30 and the air passage 23 after the time t4, whereby the pressure in the upper space 112 decreases to atmospheric pressure.

Next, an example of an abnormal operation where the clogged situation occurs in the tank passage 21 will be described. The broken line in FIG. 8 shows a change in the pressure of the tank passage 21 based on the signal from the pressure sensor 61. It is assumed that the specified portion sp1 of the tank passage 21 is clogged.

The description until the time t1 is the same as the above normal operation, and thus will be omitted.

In this example (the broken line in FIG. 8), the clogged situation in the tank passage 21 occurs at the specified portion sp1. Therefore, an air in the upper space 112 does not flow through the ventilation passage fr toward the atmosphere even when the fuel refill through the fuel nozzle 90 continues after the time t1. In this case, the pressure in the tank passage 21 has the same value as the atmospheric pressure.

At time t3 when the first time period T1 elapsed from the time t1, the ECU 50 (the abnormality detecting portion 54) compares the pressure (the atmospheric pressure) detected by the pressure sensor 61 with the reference value pth and then determines whether the detected pressure is less than the reference value pth. In this example, since the detected pressure (the atmospheric pressure) is less than the reference value pth, the ECU 50 (the abnormality detecting portion 54) determines that "the portion of the tank passage 21 between the pressure sensor 61 and the fuel tank 11 is clogged", and thus detects the clogged situation.

When the fuel tank 11 is full at time t4, the opening 14 is closed by the fuel level valve 15. After the time t4, the pressure in the tank passage 21 maintains to have the same value as the atmospheric pressure.

As described above, the pressure sensor 61 detects a pressure in the fuel tank 21 and outputs a signal according to the detected pressure.

The fuel refill detecting portion 53 detects that fuel refill to the fuel tank 11 is started or fuel refill to the fuel tank 11 is being performed by executing the fuel refill detecting process (Step 202).

The abnormality detecting portion 54 detects, by executing the abnormality detecting process (Steps 203 to 205), the clogged situation where the tank passage 21 is clogged based on the signal from the pressure sensor 61 received after the fuel refill detecting portion 53 detected that the fuel refill to the fuel tank 11 was started.

In the present embodiment, the clogged situation can be detected using the change in the pressure of the upper space 112 due to the fuel refill to the fuel tank 11. Accordingly, the signal output from the pressure sensor 61 can be stable as compared to a situation where the clogged situation is detected using a negative pressure of an intake air, whereby accuracy of detecting the clogged situation can be improved, as with the first embodiment.

Furthermore, the pressure sensor 61 is configured to detect a pressure in the tank passage 21. The abnormality detecting portion 54 detects the clogged situation in the abnormality detecting process when the pressure detected by the pressure sensor 61 after the first time period T1 elapsed from when the fuel refill detecting portion 53 detected that the fuel refill to the fuel tank 11 was started is less than the reference value pth.

Furthermore, the reference value pth is set to be a value less than flow resistance pr in the ventilation passage fr formed of the tank passage 21, the canister 30, and the air passage 23. Therefore, accuracy of detecting the clogged situation can be improved.

Furthermore, the tank passage 21 includes the specified portion sp1 that is positioned lower in the vertical direction than the first imaginary plane hp1 on which the one end of the tank passage 21 is positioned and the second imaginary plane hp2 on which the other end of the tank passage 21 is positioned in a state where the tank passage 21 is installed in the vehicle 1.

Furthermore, the pressure sensor 61 is configured to detect a pressure on a side of the specified portion sp1 opposite to the fuel tank 11.

Liquefied fuel vapors and foreign substances are easily accumulated in the specified portion sp1. Thus, the present embodiment is especially suitable for such a system having the tank passage 21 with the specified portion sp1.

Fourth Embodiment

Figure 9:
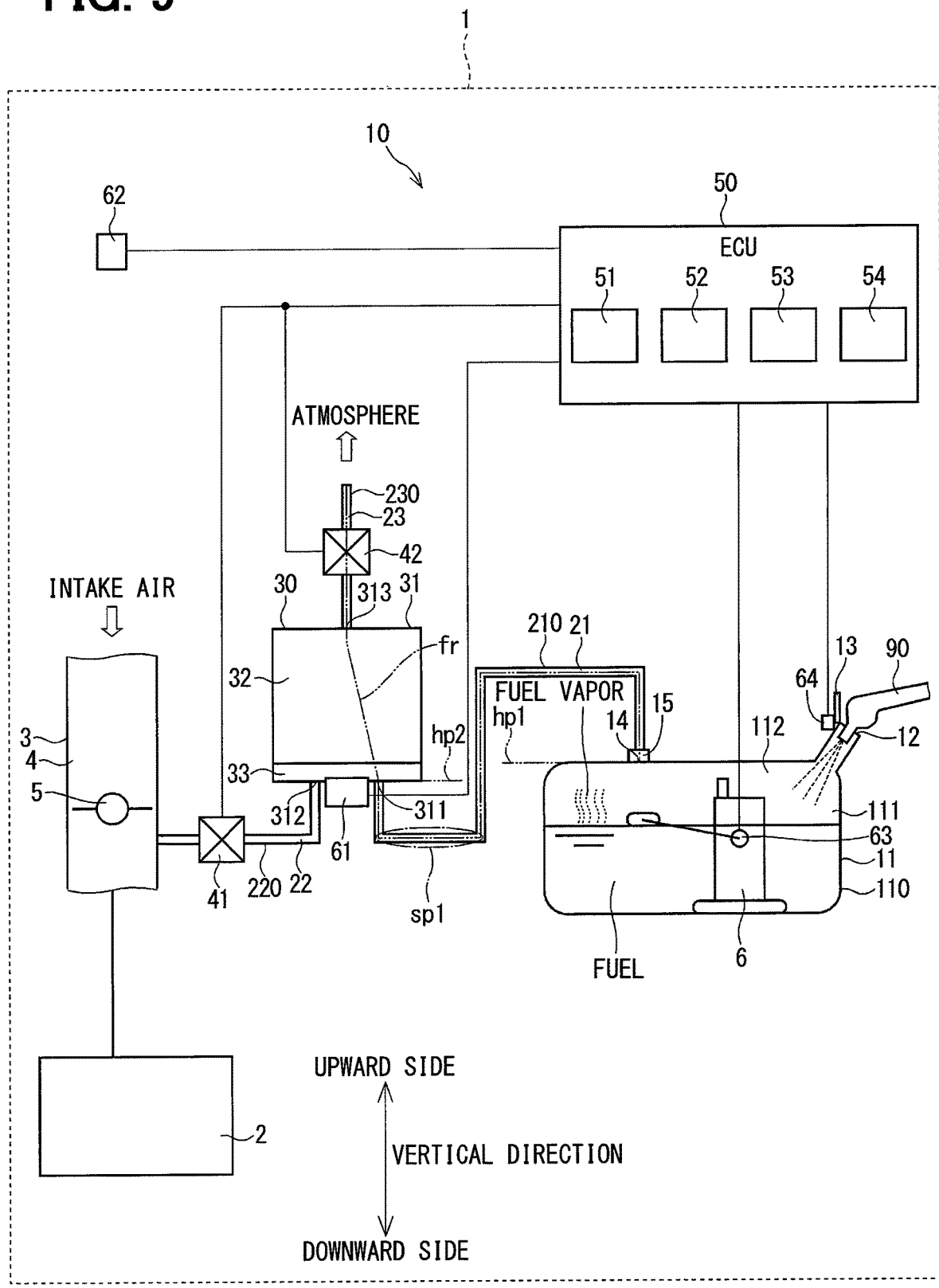
FIG. 9 is a schematic view of a fuel vapor processing system according to a fourth embodiment.

A fuel vapor processing system according to a fourth embodiment will be described with reference to FIG. 9. In the fourth embodiment, the arrangement of the pressure sensor 61 is different from that of the first embodiment.

In the fourth embodiment, the pressure sensor 61 is attached to the case 31 of the canister 31 to detect a pressure in the space 33 of the canister 30. Then, the pressure sensor 61 outputs a signal according to the detected pressure to the ECU 50. Therefore, the ECU 50 can obtain the pressure in the space 33 of the canister 30. In other words, the pressure sensor 61 is disposed to detect a pressure on a side of the specified portion sp1 opposite to the fuel tank 11.

It should be noted that flow resistance in a region of the canister 30 between the case opening 311 and the case opening 312 (i.e., the space 33) is substantially zero. Thus, the pressure in the tank passage 21 is the same as the pressure in the space 33 of the canister 30 regardless of whether an air flows through the ventilation passage fr.

In the fourth embodiment, the structure other than the above-described structure and the fuel refill detecting process and the abnormality detecting process by the ECU 50 are the same as the third embodiment.

As described above, the pressure sensor 61 is configured to detect a pressure in the canister 30 and outputs a signal according to the detected pressure.

The fuel refill detecting portion 53 detects that fuel refill to the fuel tank 11 is started or fuel refill to the fuel tank 11 is being performed by executing the fuel refill detecting process (Step 202).

The abnormality detecting portion 54 detects, by executing the abnormality detecting process (Steps 203 to 205), the clogged situation where the tank passage 21 is clogged based on the signal from the pressure sensor 61 received after the fuel refill detecting portion 53 detected that the fuel refill to the fuel tank 11 was started.

Fifth Embodiment

Figure 10:
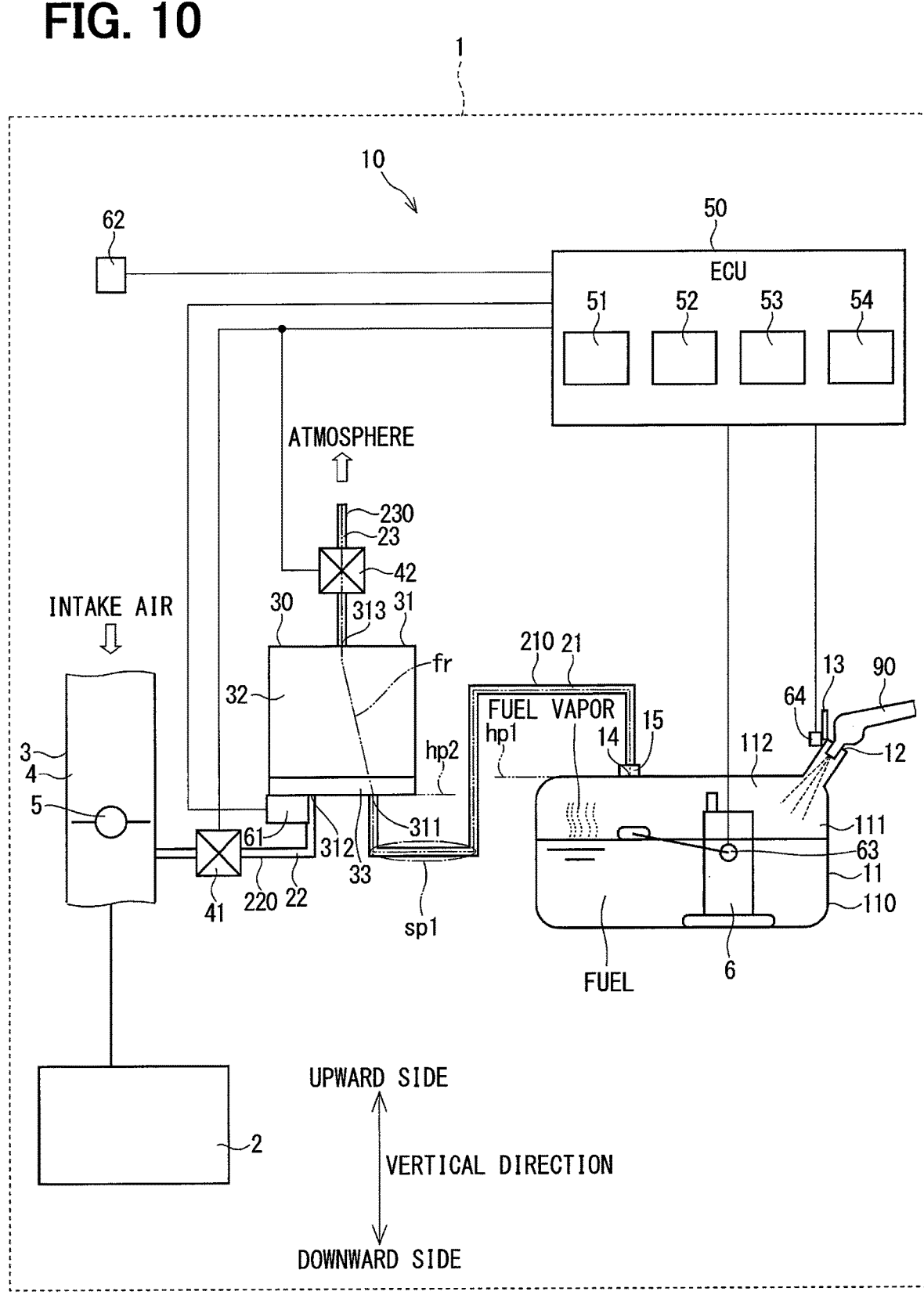
FIG. 10 is a schematic view of a fuel vapor processing system according to a fifth embodiment.

A fuel vapor processing system according to a fourth embodiment will be described with reference to FIG. 10. In the fifth embodiment, the arrangement of the pressure sensor 61 is different from that of the third embodiment.

In the fifth embodiment, the pressure sensor 61 is disposed in the purge passage member 220 to detect a pressure in the purge passage 22. Then, the pressure sensor 61 outputs a signal according to the detected pressure to the ECU 50. Therefore, the ECU 50 can obtain the pressure in the purge passage 22. The pressure sensor 61 is disposed to be in contact with or close to the canister 30. That is, the pressure sensor 61 is disposed around the one end of the purge passage 22 to detect a pressure at, especially, the one end of the purge passage 22. Therefore, the pressure sensor 61 is disposed to detect a pressure on a side of the specified portion sp1 opposite to the fuel tank 11.

It should be noted that flow resistance in a region of the canister 30 between the case opening 311 and the case opening 312 (i.e., the space 33) is substantially zero. Thus, the pressure in the tank passage 21 is the same as the pressure in the purge passage 22 regardless of whether an air flows through the ventilation passage fr.

In the fifth embodiment, the structure other than the above-described structure and the fuel refill detecting process and the abnormality detecting process by the ECU 50 are the same as the third embodiment.

As described above, the pressure sensor 61 is configured to detect a pressure in the purge passage 22 and outputs a signal according to the detected pressure.

The fuel refill detecting portion 53 detects that fuel refill to the fuel tank 11 is started or fuel refill to the fuel tank 11 is being performed by executing the fuel refill detecting process (Step 202).

The abnormality detecting portion 54 detects, by executing the abnormality detecting process (Steps 203 to 205), the clogged situation where the tank passage 21 is clogged based on the signal from the pressure sensor 61 received after the fuel refill detecting portion 53 detected that the fuel refill to the fuel tank 11 was started.

The pressure sensor 61 is configured to detect a pressure in the purge passage 22. The flow resistance in a region of the canister 30 between the tank passage 21 and the purge passage 22 is substantially zero, i.e., less than a specified value. Thus, the clogged situation can be accurately detected when the pressure sensor 61 is disposed in the purge passage 22.

Sixth Embodiment

Figure 11:
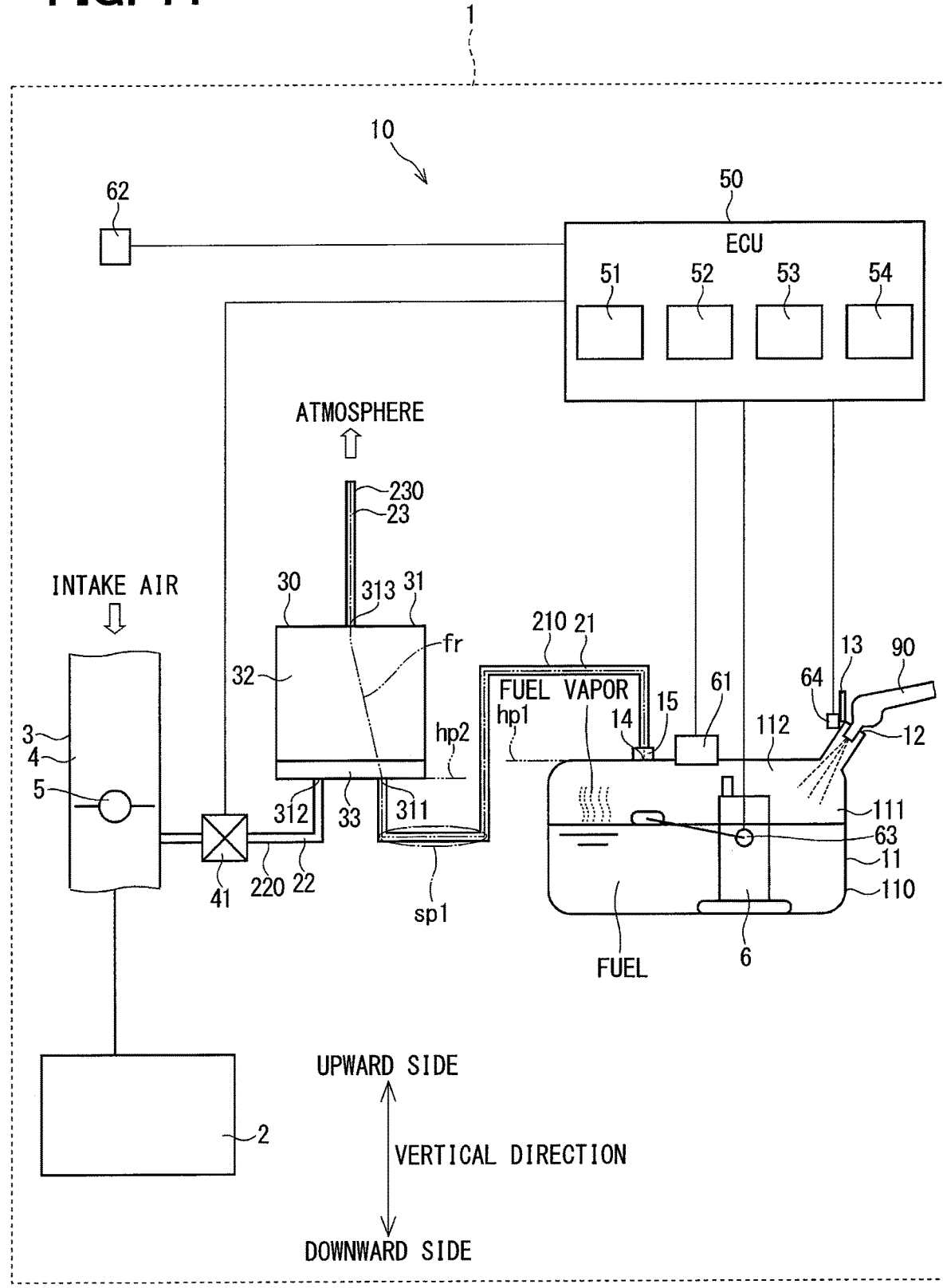
FIG. 11 is a schematic view of a fuel vapor processing system according to a sixth embodiment.

A fuel vapor processing system according to a sixth embodiment will be described with reference to FIG. 11. In the sixth embodiment, the number of components is smaller than the first embodiment.

In the fuel vapor processing system according to the sixth embodiment, the air valve 42 described in the first embodiment is eliminated.

In the sixth embodiment, the structure other than the above-described structure and the fuel refill detecting process and the abnormality detecting process by the ECU 50 are the same as the first embodiment.

Since the air valve 42 is eliminated in the sixth embodiment, the abnormal detecting sensor 54 is not able to detect "the releasing situation where the fuel vapors are released out of the fuel tank 11, the tank passage 21, the canister 30, the purge passage 22, or the air passage 23".

Other Embodiments

In the first embodiment, the second time period and the third time period are set to 10 seconds. Alternatively, the second time period and the third time period may be set to a time period other than 10 seconds according to a refilling speed from the fuel nozzle 90 (i.e., a fuel refilling amount per unit time).

The reference value pth may be set to a specified value independent of the flow resistance pr in the ventilation passage.

The specified portion sp1 may be eliminated in the tank passage 21.

In the third embodiment, the pressure sensor 61 is disposed to be in contact with or close to the canister 30. Alternatively, the pressure sensor 61 may be disposed to a position away from the canister 30. However, the pressure sensor 61 is preferably disposed to a position close to the canister 30 as much as possible.

In the third embodiment, the pressure sensor 61 is configured to detect a pressure on a side of the specified portion sp1 opposite to the fuel tank 11. Alternatively, the pressure sensor 61 may be configured to detect a pressure on a side of the specified portion sp1 close to the fuel tank 11.

In the above-described embodiments, the abnormality detecting portion 54 sets the first time period T1 based on an amount of the fuel in the fuel tank 11. Alternatively, the abnormality detecting portion 54 may set the first time period T1 sufficient for the pressure in the upper space 112 to reach the flow resistance pr.

In the first and second embodiments, the fuel refill detecting portion 53 detects, based on the signal from the fuel level sensor 63, that fuel refill to the fuel tank 11 is started or fuel refill to the fuel tank 11 is being performed. Alternatively, the fuel refill detecting portion 53 may detect, based on the signal from the pressure sensor 61 not the signal from the fuel level sensor 63, that fuel refill to the fuel tank 11 is started or fuel refill to the fuel tank 11 is being performed.

In the above-described embodiments, the abnormality detecting portion 54 determines whether the releasing situation occurs by causing the controller 51 to control the purge valve 41 and the air valve 42 to close the purge passage 22 and the air passage 23, respectively, based on the signal from the pressure sensor 61 received immediately after the vehicle 1 traveled for a specified time and then the engine 2 was stopped. Alternatively, the abnormality detecting portion 54 may close the purge valve 41 and the air valve 42 after the temperature in the fuel tank 11 increased, and then after specified time period elapses, may detect the releasing situation by determining whether the pressure detected by the pressure sensor 61 is equal to or less than the atmospheric pressure. When the pressure detected by the pressure sensor 61 is equal to the atmospheric pressure, the abnormality detecting portion 54 determines that the releasing situation occurs. Conversely, when the pressure detected by the pressure sensor 61 is less than the atmospheric pressure, the abnormality detecting portion 54 determines that the releasing situation does not occur, i.e., the operation is normal.

The air valve 42 may be eliminated in the second to fifth embodiments.

What is claimed is:

1. A fuel vapor processing system:
  a tank passage that has one end connected to a fuel tank storing fuel;
  a canister that absorbs fuel vapors generated from the fuel in the fuel tank through evaporation, the canister being connected to another end of the tank passage;
  a purge passage that has one end connected to the canister and another end connected to an intake passage of an internal combustion engine of a vehicle;
  a purge valve that selectively opens and closes the purge passage;
  an air passage that has one end connected to the canister and another end open toward an atmosphere;
  an air valve that selectively opens and closes the air passage;
  a controller that controls operation of the purge valve and the air valve;
  a fuel vapor processing portion that discharges the fuel vapors into the intake passage by controlling the purge valve through the controller;
  a pressure sensor that detects a pressure in the fuel tank or in the tank passage on one side of the tank passage adjacent to the fuel tank, the pressure sensor outputting a signal according to the detected pressure;
  a fuel refill detecting portion detecting that fuel refill to the fuel tank is started or fuel refill to the fuel tank is being performed by executing a fuel refill detecting process; and
  an abnormality detecting portion that detects, by executing an abnormality detecting process, a clogged situation where the tank passage is clogged, wherein
  the abnormality detecting portion detects the clogged situation based on the signal from the pressure sensor, the signal corresponds to a pressure detected by the pressure sensor after the fuel refill detecting portion detected that the fuel refill to the fuel tank was started and while the fuel refill detecting portion detects that the fuel refill is being performed,
  the controller opens the air valve and closes the purge valve while the abnormality detecting portion executes the abnormality detecting process, and
  the abnormality detecting portion determines that the clogged situation in the tank passage is occurring upon detecting an increase of the pressure on the one side of the tank passage within a specified time period.

2. The fuel vapor processing system according to claim 1, wherein
  the pressure sensor is configured to detect a pressure in the fuel tank, and
  the abnormality detecting portion detects the clogged situation in the abnormality detecting process when the pressure detected by the pressure sensor increases, after a first time period elapsed from when the fuel refill detecting portion detected that the fuel refill to the fuel tank was started, until a second time period elapses from when the first time period elapsed.

3. The fuel vapor processing system according to claim 2, wherein
  the abnormality detecting portion detects the clogged situation in the abnormality detecting process when the pressure detected by the pressure sensor continuously increases during a third time period after the first time period elapsed from when the fuel refill detecting portion detected that the fuel refill to the fuel tank was started.

4. The fuel vapor processing system according to claim 2, wherein
  the abnormality detecting portion detects the clogged situation in the abnormality detecting process when the pressure detected by the pressure sensor is equal to or greater than a reference value.

5. The fuel vapor processing system according to claim 4, wherein
  the reference value is set to be a value less than flow resistance in a ventilation passage formed of the tank passage, the canister, and the air passage.

6. The fuel vapor processing system according to claim 2, wherein
  the tank passage includes a specified portion that is positioned, in a state where the tank passage is installed in the vehicle, lower in a vertical direction than a first imaginary plane on which the one end of the tank passage is positioned and a second imaginary plane on which the other end of the tank passage is.

7. The fuel vapor processing system according to claim 2, wherein
the abnormality detecting portion sets the first time period based on an amount of the fuel in the fuel tank.

8. The fuel vapor processing system according to claim 1, wherein
the pressure sensor is configured to detect a pressure in the tank passage, the canister, or the purge passage, and
the abnormality detecting portion detects the clogged situation in the abnormality detecting process when the pressure, which is detected by the pressure sensor after a first time period elapsed from when the fuel refill detecting portion detected that the fuel refill to the fuel tank was started, is less than a reference value.

9. The fuel vapor processing system according to claim 8, wherein
the reference value is set to be a value less than flow resistance in a ventilation passage formed of the tank passage, the canister, and the air passage.

10. The fuel vapor processing system according to claim 8, wherein
the tank passage includes a specified portion that is positioned, in a state where the tank passage is installed in the vehicle, lower in a vertical direction than a first imaginary plane on which the one end of the tank passage is positioned and a second imaginary plane on which the other end of the tank passage is positioned.

11. The fuel vapor processing system according to claim 10, wherein
the pressure sensor is configured to detect a pressure on a side of the specified portion opposite to the fuel tank.

12. The fuel vapor processing system according to claim 8, wherein
the pressure sensor is configured to detect a pressure in the purge passage, and
flow resistance in a region of the canister between the tank passage and the purge passage is equal to or less than a specified value.

13. The fuel vapor processing system according to claim 1, further comprising
a speed sensor that detects a vehicle speed, the speed sensor outputting a signal according to the detected vehicle speed, wherein
the fuel refill detecting portion executes the fuel refill detecting process when the vehicle speed detected by the speed sensor is zero.

14. The fuel vapor processing system according to claim 1, further comprising
a fuel level sensor that detects an amount of the fuel in the fuel tank, the fuel level sensor outputting a signal according to the detected amount of the fuel, wherein
the fuel refill detecting portion detects, based on the signal from the fuel level sensor, that fuel refill to the fuel tank is started or fuel refill to the fuel tank is being performed in the fuel refill detecting process.

15. The fuel vapor processing system according to claim 14, wherein
the abnormality detecting portion detects the clogged situation based on both the signal from the fuel level sensor and the signal from the pressure sensor.

16. The fuel vapor processing system according to claim 1, further comprising
a cap sensor that detects an open state and a closed state of a fuel cap that selectively opens and closes a fuel tank opening of the fuel tank, the cap sensor outputting a signal corresponding to the detected state of the fuel cap, wherein
the fuel refill detecting portion is configured to execute the refill detecting process when the cap sensor detects the open state of the fuel cap.

17. The fuel vapor processing system according to claim 1, wherein
a releasing situation is defined a situation where the fuel vapors are released out of the fuel tank, the tank passage, the canister, the purge passage, or the air passage, and,
the abnormality detecting portion detects the releasing situation based on the signal from the pressure sensor received after the internal combustion engine was stopped and the purge passage and the air passage were closed by the purge valve and the air valve, respectively, through the controller.

18. The fuel vapor processing system according to claim 1, wherein
the pressure sensor is attached to the fuel tank and detects a pressure in the fuel tank, and
the abnormality detecting portion detects the clogged situation based on the signal from the pressure sensor, the signal corresponds to a pressure in the fuel tank detected by the pressure sensor after the fuel refill detecting portion detected that the fuel refill to the fuel tank was started and while the fuel refill detecting portion detects that the fuel refill is being performed.

* * * * *